(12) United States Patent
Shiu et al.

(10) Patent No.: US 9,107,271 B2
(45) Date of Patent: Aug. 11, 2015

(54) LED DRIVING CIRCUIT

(71) Applicant: GREEN SOLUTION TECHNOLOGY CO., LTD., New Taipei (TW)

(72) Inventors: Shian-Sung Shiu, New Taipei (TW); Chia-Ming Chan, New Taipei (TW); Ying Wang, Wuxi (CN)

(73) Assignee: GREEN SOLUTION TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/158,873

(22) Filed: Jan. 20, 2014

(65) Prior Publication Data

US 2015/0115818 A1    Apr. 30, 2015

(30) Foreign Application Priority Data

Oct. 29, 2013   (CN) .......................... 2013 1 0522079

(51) Int. Cl.
*G05F 1/00*       (2006.01)
*H05B 33/08*     (2006.01)

(52) U.S. Cl.
CPC .................................. *H05B 33/089* (2013.01)

(58) Field of Classification Search
CPC ....................................................... H05B 33/02
USPC ........................... 315/291, 307, 312, 246, 247
See application file for complete search history.

(56) References Cited

U.S. PATENT DOCUMENTS

| | | |
|---|---|---|
| 2012/0049741 A1 | 3/2012 | Ye et al. |
| 2012/0049761 A1* | 3/2012 | Yu et al. .......................... 315/294 |
| 2012/0062132 A1 | 3/2012 | Lin et al. |
| 2012/0086359 A1 | 4/2012 | Wang et al. |
| 2012/0119650 A1* | 5/2012 | Lee ................................ 315/122 |
| 2013/0026933 A1 | 1/2013 | Gao |
| 2013/0200812 A1* | 8/2013 | Radermacher et al. ........ 315/186 |
| 2013/0278145 A1* | 10/2013 | Lin et al. ........................ 315/122 |

FOREIGN PATENT DOCUMENTS

| | | |
|---|---|---|
| TW | 201123974 A | 7/2011 |
| TW | 201345316 A | 11/2013 |

* cited by examiner

*Primary Examiner* — Minh D A
(74) *Attorney, Agent, or Firm* — CKC & Partners Co., Ltd.

(57) ABSTRACT

A LED (Light-Emitting Diode) driving circuit including at least one light-emitting unit and a protection detecting circuit, is provided. Each light-emitting unit includes an LED string coupled to a driving voltage, a current regulator and a transistor. The current regulator is coupled to a corresponding LED string and controls a current flowing therethrough. The transistor is coupled between the LED string and the current regulator. The protection detecting circuit generates a clamping reference level signal to a control terminal of the at least one transistor and is coupled to a connection node of the at least one transistor and the at least one LED string. When a voltage of any connection node is higher than a preset protection value, the protection detecting circuit decreases the clamping reference value to reduce or cut off the current of the at least one LED string.

20 Claims, 4 Drawing Sheets

LED DRIVING CIRCUIT

RELATED APPLICATIONS

This application claims priority to Chinese Application Serial Number 201310522079.X, filed Oct. 29, 2013, which is herein incorporated by reference.

BACKGROUND OF THE INVENTION (1) Field of the Invention

The invention relates to an LED driving circuit, and more particularly relates to an LED driving circuit with protection function.

(2) Description of the Prior Art

Figure 1:
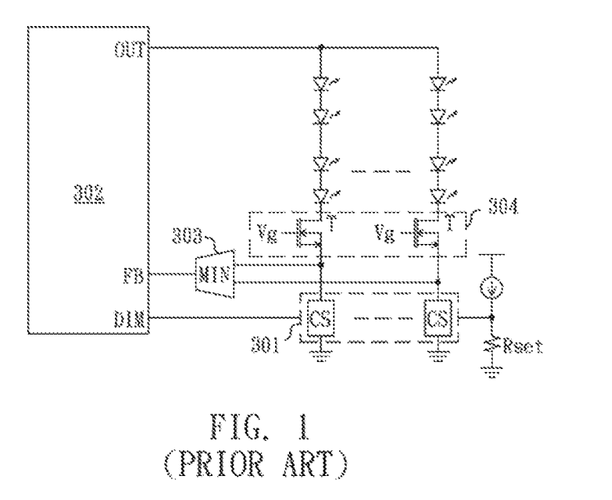
FIG. 1 is a schematic diagram of a conventional LED driving circuit disclosed in U.S. patent publication No. 20120049741.

FIG. 1 is a schematic diagram of a conventional LED driving circuit disclosed in U.S. patent publication No. 20120049741. The LED driving circuit comprises a power supply unit 302. The power supply unit 302 has a dimming output terminal DIM, a feedback terminal FB and an output terminal OUT. The feedback terminal FB receives a lowest feedback signal. The power supply unit 302 generates a driving voltage at the output terminal OUT based on an input voltage and the lowest feedback signal for driving a plural LED string. A current balance circuit 301 has an input terminal and plural output terminals. The input terminal is configured to receive a reference voltage, and the output terminals are coupled to a corresponding negative terminal of the LED strings for regulating currents of the LED strings. A feedback selector 303 has plural input terminals and an output terminal. The input terminals of the feedback selector 303 are respectively coupled to the negative terminals of the LED strings for receiving feedback signals indicative of the voltages drop of the LED strings. The feedback selector 303 generates the lowest feedback signal at the output terminal based on the received feedback signals.

The power supply unit 302 regulates the driving voltage based on the lowest feedback signal, and thus the driving voltage is at the lowest voltage value that is enough to drive the plural LED string. The current balance circuit 301 has plural current sources CS, and each current source CS is coupled to the negative terminal of a corresponding LED string for regulating the current of the corresponding LED string. A first terminal of a current setting resistance Rset is coupled to all of the current sources CS, and a second terminal thereof is coupled to the ground. The currents, provided by the current sources CS, can be adjusted by adjusting the resistance value of the current setting resistance Rset. The dimming output terminal DIM of the power supply unit 302 is adapted to provide a dimming signal to each of the current sources CS.

A protection circuit 304 is coupled between the negative terminal of the LED string and the current balance circuit 301 for protecting the current balance circuit 301 from overvoltage. The protection circuit 304 has plural transistors T each of which has a first terminal, a second terminal and a control terminal. The control terminals are coupled to a preset voltage Vg, the first terminals are respectively coupled to the negative terminals of the LED strings, and the second terminals are coupled to the current balance circuit 301. The withstand voltages of the transistors T are higher than the driving voltage generated by the power supply unit 302. When the LED string is short circuited, the protection circuit 304 endures most of the driving voltage, and protects the current balance circuit 301 from being damaged by directly coupling to the driving voltage.

However, because the current balance circuit 301 still operates normally, the transistors T of the protection circuit 304 not only endure a voltage which is almost equal to the driving voltage, but also flowed with a preset current for driving the LED strings, thus causing the transistors T to have excessive power consumption resulting in over-temperature damage. The damaged transistors T are not able to perform the original protection function, and the current balance circuit 301 is also damaged, thus failing to achieve the expected protection function in practice.

It is to be understood that both the foregoing general description and the following detailed description are exemplary, and are intended to provide further explanation of the invention as claimed. In order to make the features and the advantages of the invention comprehensible, exemplary embodiments accompanied with figures are described in detail below.

SUMMARY OF THE INVENTION

In view of the problem of the conventional the protection circuit damaged by too high temperature, the present invention provides a LED driving circuit to detect the cross voltage of the transistor. When the cross voltage is determined to be too high, the current of the LED string is reduced or cut off, thus protecting the transistor from overheat damage.

To accomplish the aforementioned and other objects, the present invention provides an LED driving circuit comprising at least one light-emitting unit and a protection detecting circuit. Each the light-emitting unit comprises an LED string coupled to a driving voltage, a current regulator and a transistor. The current regulator is coupled to a corresponding LED string for controlling a current flowing through the corresponding LED string. The transistor has a first terminal coupled to the corresponding LED string and a second terminal coupled to the current regulator. The protection detecting circuit is coupled to the at least one first terminal and receives a dimming signal. The protection detecting circuit generates a protection signal when the dimming signal represents a first state and any first terminal has a voltage higher than a preset protection value, and the protection detecting circuit stops generating the protection signal when the dimming signal represents a second state. Wherein, all transistors or the transistor corresponding to the first terminal having voltage higher than the protection value reduces or cut off the current there through when the protection signal is generated.

The present invention also provides an LED driving circuit, comprising at least one light-emitting unit and a protection detecting circuit. Each the light-emitting unit comprises an LED string coupled to a driving voltage, a current regulator and a transistor. The current regulator is coupled to a corresponding LED string for controlling a current flowing through the corresponding LED string. The transistor has a first terminal coupled to the corresponding LED string and a second terminal coupled to the current regulator. The protection detecting circuit is coupled to the at least one first terminal and receives a dimming signal. The protection detecting circuit generates a protection signal when the dimming signal represents a first state and any first terminal has a voltage higher than a preset protection value, and stops generating the protection signal when the dimming signal represents a second state. Wherein, all current regulators or the current regulator corresponding to the first terminal having a voltage higher than the protection value reduces or cut off the current flowing therethrough when the protection signal is generated.

The present invention still provides an LED driving circuit comprising at least one light-emitting unit and a protection detecting circuit. Each the light-emitting unit comprises an LED string coupled to a driving voltage, a current regulator and a transistor. The current regulator is coupled to a corresponding LED string to control a current flowing through the corresponding LED string. The transistor has a first terminal coupled to the LED string and a second terminal coupled to the current regulator. The protection detecting circuit is coupled to the at least one first terminal, and generates a clamping reference level signal to a control terminal of each transistor of the at least one light-emitting unit. Wherein, the protection detecting circuit decreases a level of the clamping reference level signal to reduce or cut off the current of the at least one LED string when any voltage of the at least one first terminal is higher than a preset protection value.

The present invention still provides an LED driving circuit comprising plural LED strings, a current regulator, plural transistors, and plural protection detecting circuits. The LED strings are coupled to a driving voltage. The current regulator is coupled to the LED strings to control a current flowing through the LED strings. The transistors are coupled between a corresponding LED string and a corresponding current regulator. The plural protection detecting circuit is coupled to a connection node of the corresponding LED string and the corresponding transistor, and receives a dimming signal. Wherein, each protection detecting circuit generates a protection signal to enable the corresponding transistor or the corresponding current regulator to reduce or cut off the current of the corresponding LED string when the dimming signal represents a first state and a voltage of the corresponding connection node is higher than a preset protection value, and each protection detecting circuit stops generating the protection signal when the dimming signal represents a second state.

It is to be understood that both the foregoing general description and the following detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 2:
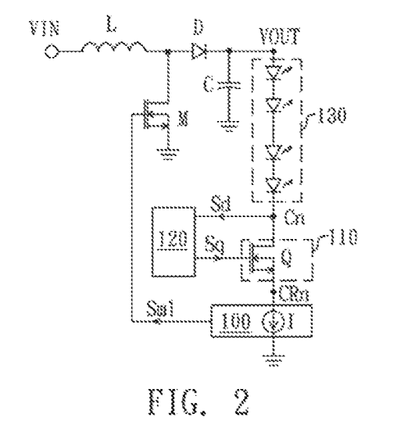
FIG. 2 is a schematic diagram of an LED driving circuit according a first preferred embodiment of the present invention.

FIG. 2 is a schematic diagram of an LED driving circuit according to a first preferred embodiment of the present invention. The LED driving circuit comprises a current regulator 100, a clamping protection circuit 110, a protection detecting circuit 120 and an LED string 130. The LED string 130 is coupled to a driving voltage VOUT to receive a required current for emitting light. The driving voltage VOUT is provided by a switching converter. In the present embodiment, the switch converter is a DC-DC converter comprising an inductance L, a power switch M, a rectifying diode D and an output capacitance C. The power switch M is periodically turned on and off according to a control signal Sm1, and thus an energy of an input voltage VIN is filtered and rectified by the inductance L, the rectifying diode D and the output capacitance C to provide the driving voltage VOUT. In the practical application, the present invention can apply any power supply which provides a DC voltage, such as a forward converter, a flyback converter, a DC-DC buck converter, a half-bridge converter circuit, and a full-bridge converter circuit.

The current regulator 100 is coupled to the LED string 130 via a current regulating connection node CRn to stabilize the current flowing through the LED string at a preset current value. In the present embodiment, the current regulator 100 comprises a current source I, which may be a fixed current source or a controlled current source for allowing a user to adjust the current of the LED string according to an actual requirement. The current regulator 100 generates the control signal Sm1 to the power switch M according to the current flowing through the LED string 130 or a voltage across the LED string 130 to enable the power provided by the DC-DC converter to maintain the current of the LED string 130 stabilized at the preset current value.

The clamping protection circuit 110 is coupled between the LED string 130 and the current regulator 100. The clamping protection circuit 110 comprises a transistor Q which has a first terminal, a second terminal and a control terminal. The first terminal of the transistor Q is coupled to the LED string 130, and the second thereof is coupled to the current regulator 100, and the control terminal thereof receives a clamping reference level signal Sq. When a voltage of the second terminal of the transistor Q is increased to be lower than a level of the clamping reference level signal Sq by a threshold voltage of the transistor Q due to an abnormal operation of the LED driving circuit, the transistor Q is cut off to avoid the voltage of the second terminal of the transistor Q. i.e., the current regulating connection node CRn of the current regulator 100 continuously increases. Thus, the voltage of the current regulating connection node CRn of the current regulator 100 can be clamped to be lower than the level of the clamping reference level signal Sq. Therefore, the voltage of the current regulating connection node CRn can be ensured to be lower than a withstand voltage of the current regulator 100 for protecting the current regulator 100 from overvoltage. In addition, a withstand voltage of the transistor Q has to be higher than the driving voltage VOUT for achieving the aforementioned clamping function.

The protection detecting circuit 120 is coupled to a connection node Cn of the LED string 130 and the transistor Q, and receives a level detecting signal Sd indicative of a voltage level of the connection node Cn and generates the clamping reference level signal Sq to the transistor Q. When a voltage of the connection node Cn is lower than a preset protection value, the level of the clamping reference level signal Sq is at a preset clamping level. When the voltage of the connection node Cn is higher than the preset protection value, the level of the clamping reference level signal Sq is reduced to cut the transistor Q off. At this moment, the current of the LED string 130 is reduced to zero. Therefore, the transistor Q can be prevented from being damaged due to the over-temperature problem.

Figure 3:
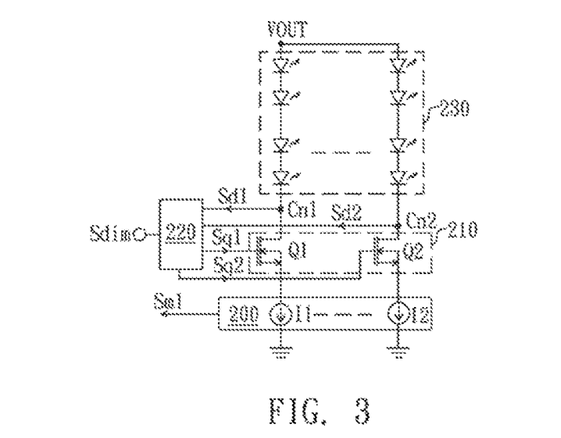
FIG. 3 is a schematic diagram of an LED driving circuit according to a second preferred embodiment of the present invention.

FIG. 3 is a schematic diagram of an LED driving circuit according to a second preferred embodiment of the present invention. The schematic diagrams and descriptions of the converter are omitted in the present embodiment and the following embodiments for focusing on the characteristics of the present invention.

The LED driving circuit comprises a current balance circuit 200, a clamping protection circuit 210, a protection detecting circuit 220 and a plural LED string 230. In order to facilitate the description, plural light-emitting units are defined, wherein each of the light-emitting units comprises a corresponding LED string among the LED strings 230, a corresponding transistor among the transistors Q1~Q2 of the clamping protection circuit 210 and a corresponding current regulator of the current regulators I1~I2 among the current balance circuit 200. Each of the LED strings 230 is connected in parallel with each other and is coupled to a driving voltage VOUT. The current regulators I1~I2 are coupled to the corresponding LED string to control the current flowing through the LED string to enable the current flowing through each of the LED strings 230 to be substantially the same. The transistors Q1~Q2 are coupled between the corresponding LED string among the LED strings 230 and the corresponding current regulator among the current regulators I1~I2. The current balance circuit 200 generates a control signal Sm1 to a converter (not shown) according to the current flowing through the LED strings 230 or the voltage across the LED strings 230. Therefore, power provided by the converter can maintain the current of the plural LED string 230 to be stabilized at a preset current value.

The protection detecting circuit 220 is coupled to connection nodes Cn1~Cn2 of the transistors and the LED strings of the light-emitting units 230 for receiving level detecting signals Sd1~Sd2 respectively indicative of the levels of the connection nodes Cn1~Cn2, and generates clamping reference level signals Sq1~Sq2 to the transistors Q1~Q2. The protection detecting circuit 220 of the present embodiment may comprise the plural protection detecting circuits 120 as shown in FIG. 2 for correspondingly detecting and protecting each of the transistors Q1~Q2. The levels of the clamping reference level signal Sq1~Sq2 may be set according to requirements of the actual application, the better setting is that the levels of the clamping reference level signals Sq1~Sq2 are the same as a first voltage value. At this moment, the LED driving circuit can operate normally, and the currents flowing through the LED strings 230 are substantially the same. Based on the level detecting signals Sd1~Sd2, the protection detecting circuit 220 determines whether any one of the levels of the connection nodes Cn1~Cn2 is higher than a preset protection value. When any level of the connection nodes Cn1~Cn2 is abnormal and higher than the preset protection value, at least, the level of the corresponding clamping reference level signal is reduced to a second voltage value. Thus, the transistor corresponding to the abnormal connection node is cut off and the current thereof is reduced to be zero. Alternatively, when any level of the connection nodes Cn1~Cn2 is higher than the preset protection value, the protection detecting circuit 220 may reduce all of the clamping reference level signals Sq1~Sq2 to the second voltage value to make the LED driving circuit enter a protection mode.

The protection circuit 220 may additionally receive a dimming signal Sdim. The dimming signal Sdim is switched between a first level and a second level. When the dimming signal Sdim is at the first level, it represents that the LED driving circuit is operated under a first state. At this moment, the LED strings 230 emit light. When the dimming signal Sdim is at the second level, it represents that the LED driving circuit is operated under a second state. At this moment, the LED strings 230 stop emitting light. By adjusting the time periods of the first state and the second state, the dimming rate can be modulated. At the second state, the LED strings 230 stop emitting light, and thus a voltage across the LED strings 230 is reduced while the levels of the connection nodes Cn1~Cn2 are raised. To avoid the erroneous judgment of the protection detecting circuit 220 at this moment, the protection detecting circuit 220 stops decreasing the levels of the clamping reference level signals Sq1~Sq2 when the dimming signal Sdim represents the second state, even if any level of the connection nodes Cn1~Cn2 is higher than the preset protection value. When the dimming signal Sdim represents the first state and any voltage of the connection nodes Cn1~Cn2 is higher than the preset protection value, the protection detecting circuit 220 decreases the levels of all the clamping reference level signals or a level of the corresponding clamping reference level signal to cut off all of the LED strings or the current flowing through the abnormal LED string.

Figure 4:
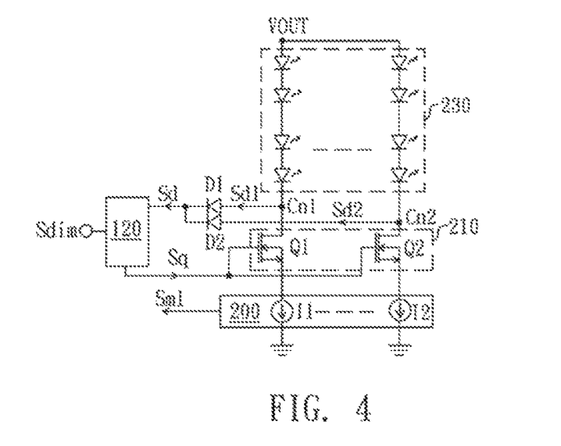
FIG. 4 is a schematic diagram of an LED driving circuit according to a third preferred embodiment of the present invention.

FIG. 4 is a schematic diagram of an LED driving circuit according to a third preferred embodiment of the present invention. Compared with the embodiment shown in FIG. 3, the major difference is that the present embodiment uses plural diodes D1~D2 each of which has a positive terminal coupled to a corresponding connection node of the connection nodes Cn1~Cn2, and a negative terminal coupled with each other and also coupled to a protection detecting circuit 120. The diodes D1~D2 respectively receive level detecting signals Sd1~Sd2, and generate a level detecting signal Sd to the protection detecting circuit 120 according to one of the level detecting signals Sd1~Sd2 having the highest level. Therefore, the protection detecting circuit 120 can determine whether any one of the level detecting signals Sd1~Sd2 exceeds a preset protection value according to the single level detecting signal Sd. Through the diodes D1~D2, the protection detecting circuit 120 of the present embodiment can use the protection detecting circuit 120 as shown in FIG. 2 but not the protection detecting circuit 220 as shown in FIG. 3, and needs the protection detecting circuits 120 to detect and protect all of the light-emitting units.

Certainly, the protection detecting circuit 120 may additionally receive a dimming signal Sdim, such as the embodiment shown in FIG. 3. When the dimming signal Sdim represents a second state, the protection detecting circuit 120 stops decreasing a level of a clamping reference level signal Sq to cut off the transistors Q1~Q2 for stopping the current flowing through the transistors Q1~Q2, even if any voltage level of the connection nodes Cn1~Cn2 is higher than the preset protection value.

Figure 5:
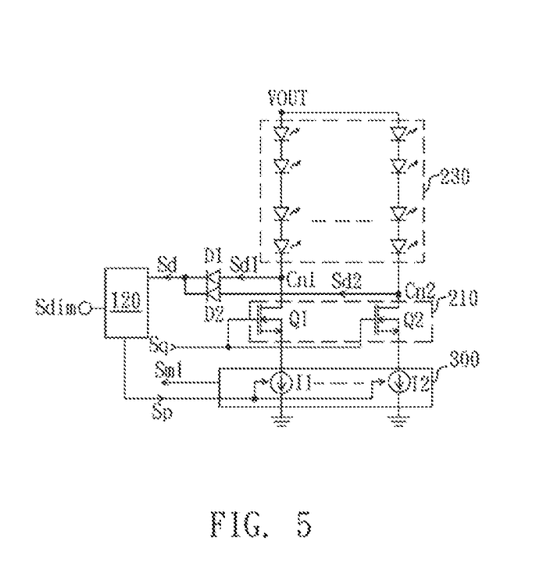
FIG. 5 is a schematic diagram of an LED driving circuit according to a fourth preferred embodiment of the present invention.

FIG. 5 is a schematic diagram of an LED driving circuit according to a fourth preferred embodiment of the present invention. Compared with the embodiment as shown in FIG. 4, a protection detecting circuit of the present embodiment alternatively controls a current balance circuit 300 to achieve the protection function. Control terminals of the transistors Q1~Q2 of a clamping protection circuit 210 are coupled to a clamping reference level signal Sq. The protection detecting circuit 120 determines whether any one of the level detecting signals Sd1~Sd2 exceeds a preset protection value according to a level detecting signal Sd. In the present embodiment, the clamping reference level signal Sq has a fixed level, regardless of whether any voltage level of the connection nodes Cn1~Cn2 is determined to be too high. If any one of the level detecting signals Sd1~Sd2 exceeds the preset protection value, the protection detecting circuit 120 generates a protection signal Sp. The current balance circuit 300 has plural current regulators I1~I2 coupled to the corresponding LED strings of the LED strings 230 to provide a preset current flowing through the corresponding LED strings of the LED strings 230. The current balance circuit 300 is coupled to the protection detecting circuit 120. When the protection signal Sp is generated, the current regulators I1~I2 reduce the current flowing through the LED strings, and even reduce the current to zero. Thus, the present invention can make sure that the heat generated by the transistors Q1~Q2 of the clamping protection circuit 210 is within a specific temperature range of the transistor.

Figure 6:
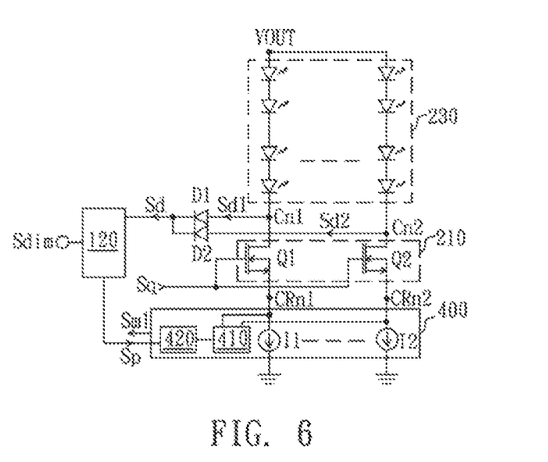
FIG. 6 is a schematic diagram of an LED driving circuit according to a fifth preferred embodiment of the present invention.

FIG. 6 is a schematic diagram of an LED driving circuit according to a fifth preferred embodiment of the present invention. Compared with the embodiment as shown in FIG. 5, a current balance 400 further comprises a safe operation detecting circuit 410 and a safe operation protecting circuit 420. The protection detecting circuit 120 of the present embodiment alternatively performs the protection function through the safe operation detecting circuit 410 and the safe operation protecting circuit 420 of the current balance circuit 400. The safe operation detecting circuit 410 is coupled to the current regulators I1~I2, and generates an error signal when a voltage or a current of the current regulator of any current regulators I1~I2 exceeds a preset safety limit value. For example, the current flowing through the current regulator is too high or too low; a terminal's voltage of any current regulators is higher or lower than a normal operation voltage range, and so on. When the safe operation protecting circuit 420 continuously receives the error signal for a first preset time period, the safe operation protecting circuit 420 enters a protection mode to reduce or cut off the abnormal current regulator or all the current regulators (i.e., reduce or cut off the current of the LED string). The conventional safe operation protecting circuit has a longer time period for avoiding erroneous judgments. However, longer first preset time period of the general safe operation protecting circuit 420 may cause the transistors Q1~Q2 of the clamping protection circuit 210 to be protected too late, and thus the transistors Q1~Q2 still have the risk of over-temperature damage. Thus, the protection detecting circuit 120 generates a protection signal Sp when it is determined that any one of the level detecting signals Sd1~Sd2 exceeds a preset protection value according to a level detection signal Sd. The level detection signal Sd is input to the safe operation protecting circuit 420 to shorten the first preset time period to a second preset time period (i.e., the second preset time period is shorter than the first preset time period). The levels of the connection nodes Cn1~Cn2 is higher than the preset protection value, and the voltages of the current regulating connection nodes CRn1~CRn2 of the current regulators I1~I2 rise at the same time and generate the error signal. At this time, the safe operation detecting circuit 410 detects the abnormal condition that the voltages of the current regulating connection nodes CRn1~CRn2 are too high and generates the error signal. Therefore, after the second preset time period, the safe operation protecting circuit 420 immediately enters the protection mode. Alternatively, the safe operation protecting circuit 420 may start to count time for entering the protection mode when receiving the protection signal Sp, regardless of whether the safe operation detecting circuit 410 detects the abnormal condition of the current regulating connection nodes CRn1~CRn2.

Moreover, the embodiments as shown in FIG. 5 and FIG. 6 both using the LED strings as an example to explain the present invention. In a practical application, the single LED string may be applied without affecting the protection function of the present invention.

Figure 7:
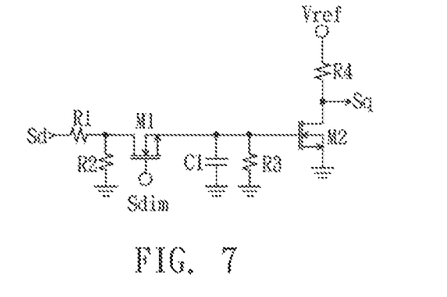
FIG. 7 is a schematic diagram of a protection detecting circuit according to a first preferred embodiment of the present invention.

FIG. 7 is a schematic diagram of a protection detecting circuit according to a first preferred embodiment of the present invention. The present embodiment and the following embodiments of the protection detecting circuit can be directly or simply modulated as the protection detecting circuit 120 of the above embodiments. The protection detecting circuit comprises a voltage divider, a dimming transistor M1, a filter circuit and a protection signal generating circuit. The voltage divider comprises resistances R1 and R2 connected in series. The resistance R1 is coupled to a level detecting signal Sd, the resistance R2 is coupled to the ground, and thus the voltage divider generates a voltage dividing signal of the level detecting signal Sd at a voltage dividing node. The dimming transistor M1 is coupled to the voltage divider and the protection signal generating circuit, and a control terminal thereof receives a dimming signal Sdim. When the dimming signal Sdim represents a first state, the dimming transistor M1 is turned on. At this time, the protection detecting circuit operates normally. When the dimming signal Sdim represents a second state, the dimming transistor M1 is cut off, and no matter what level the voltage dividing signal is at, a transistor M2 of the protection signal generating circuit cannot be turned on to generate a clamping reference level signal Sq. Therefore, the protection detecting circuit can avoid the erroneous judgment caused by a dimming process. If there is no dimming signal in the actual application or the dimming process does not affect the judgment of the protection detecting circuit, the dimming transistor M1 can be omitted. The filter circuit comprises a capacitance C1 and a resistance R3 connected in parallel to filter out noises in the voltage dividing signal generated by the voltage divider, and the filter circuit may be omitted in the actual application. The protection signal generating circuit comprises a series of a resistance R4 and the transistor M2 to generate the clamping reference level signal Sq. One terminal of the resistance R4 is coupled to a reference voltage Vref, and the other terminal thereof is coupled to one terminal of the transistor M2. The other terminal of the transistor M2 is coupled to the ground, and a control terminal thereof is coupled to the voltage dividing node of the voltage divider through the dimming transistor M1. When a level of the level detecting signal Sd represents that a voltage of a connection node of an LED driving circuit is lower than a preset protection value, the level of the voltage dividing signal is lower than a threshold voltage of the transistor M2. At this moment, the transistor M2 is turned off, and thus a level of the clamping reference level signal Sq is equal to the reference voltage Vref. If the protection detecting circuit of the present embodiment is applied to the LED driving circuits shown in FIG. 2 to FIG. 4, a level of the reference voltage Vref is decided according to the withstand voltage of the current regulator. If the protection detecting circuit of the present embodiment is applied to the LED driving circuits shown in FIG. 5 to FIG. 6, the level of the reference voltage Vref is decided according to a logic level of the current regulator.

When the level of the level detecting signal Sd represents that the voltage of the connection node is higher than the preset protection value, the level of the voltage dividing signal is higher than the threshold voltage of the transistor M2. At this moment, the transistor M2 is turned on to reduce the level of the clamping reference level signal Sq to be close to zero. Thereby, the clamping reference level signal Sq cuts off the transistors Q1~Q2 of the clamping protection circuit 210, reduces or cuts off the current of the current regulator, or trigger the safe operation protecting circuit of the current balance circuit.

Figure 8:
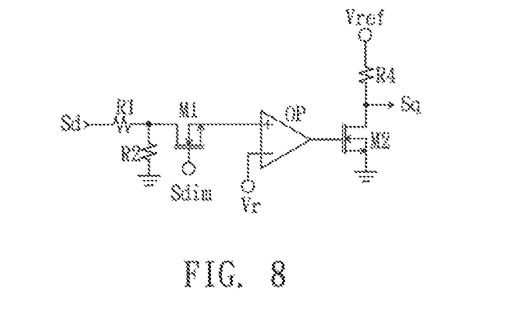
FIG. 8 is a schematic diagram of a protection detecting circuit according to a second preferred embodiment of the present invention.

FIG. 8 is a schematic diagram of a protection detecting circuit according to a second preferred embodiment of the present invention. Compared with the embodiment as shown in FIG. 7, the present embodiment uses an operation amplifier OP to replace the filter circuit. The voltage dividing node of the voltage divider is coupled to a non-inverting input terminal of the operation amplifier OP, and an inverting input terminal thereof is coupled to a reference signal Vr. When the level of the voltage dividing signal is higher than a level of the reference signal Vr, the operation amplifier OP turns on the transistor M2. Through the operation amplifier OP, the transistor M2 can be turned on exactly to avoid a problem of different protecting time points due to different threshold voltages of different transistors.

Figure 9:
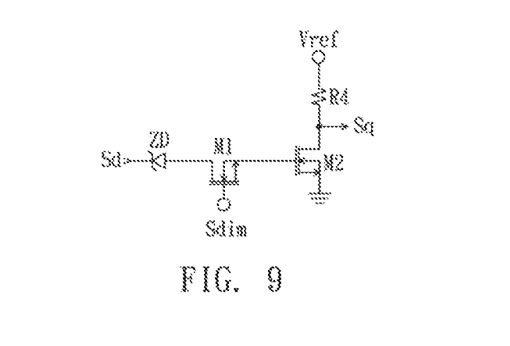
FIG. 9 is a schematic diagram of a protection detecting circuit according to a third preferred embodiment of the present invention.

FIG. 9 is a schematic diagram of a protection detecting circuit according to a third preferred embodiment of the present invention. Compared with the embodiment as shown in FIG. 7, the present embodiment uses a zener diode ZD to replace the voltage divider and further omits the filter circuit. When the level of the level detecting signal Sd represents that the voltage of the connection node is higher than the preset protection value, the level of the level detecting signal Sd is higher than a breakdown voltage of the zener diode ZD to turn on the zener diode ZD, and further turn on the transistor M2. At this moment, the protection detecting circuit generates the low level of the clamping reference level signal Sq for performing the protection function.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. An LED (Light-Emitting Diode) driving circuit, comprising:
    at least one light-emitting unit, each of the at least one light-emitting unit comprising:
        an LED string coupled to a driving voltage;
        a current regulator coupled to a corresponding LED string for controlling a current flowing through the corresponding LED string; and
        a transistor having a first terminal coupled to the corresponding LED string and a second terminal coupled to the current regulator; and
    a protection detecting circuit coupled to the at least one first terminal for receiving a dimming signal, wherein the protection detecting circuit generates a protection signal when the dimming signal represents a first state and any first terminal has a voltage higher than a preset protection value, and the protection detecting circuit stops generating the protection signal when the dimming signal represents a second state;
    wherein all transistors or the transistor corresponding to the first terminal having a voltage higher than the preset protection value reduce or cut off the current therethrough when the protection signal is generated.

2. The LED driving circuit according to claim 1, further comprising at least one diode, wherein each of the at least one diode has a positive terminal coupled to a corresponding first terminal, and a negative terminal coupled to the protection detecting circuit.

3. The LED driving circuit according to claim 2, wherein each transistor has a control terminal which receives a clamping reference level signal for clamping the voltage of the first terminal, and the current regulator stabilizes the current flowing through the corresponding LED string at a first current value, and stabilizes the current flowing through the corresponding LED string at a second current value when receiving the protection signal.

4. The LED driving circuit according to claim 2, further comprising a safe operation detecting circuit and a safe operation protecting circuit, wherein the safe operation detecting circuit is coupled to the at least one current regulator, and generates an error signal when a voltage or a current of any current regulator exceeds a preset safety limit value, and the safe operation protecting circuit enters a protection mode to make the at least one current regulator reduce or cut off the current of the LED string when receiving the error signal for a first preset time period.

5. The LED driving circuit according to claim 1, wherein each transistor has a control terminal receives a clamping reference level signal for clamping the voltage of the first terminal, and the current regulator stabilizes the current flowing through the corresponding LED string at a first current value, and stabilizes the current flowing through the corresponding LED string at a second current value when receiving the protection signal.

6. The LED driving circuit according to claim 1, further comprising a safe operation detecting circuit and a safe operation protecting circuit, wherein the safe operation detecting circuit is coupled to the at least one current regulator, and generates an error signal when a voltage or a current of any current regulator exceeds a preset safety limit value, and the safe operation protecting circuit enters a protection mode to enable the at least one current regulator to reduce or cut off the current of the LED string when receiving the error signal for a first preset time period.

7. The LED driving circuit according to claim 6, wherein the safe operation protecting circuit enters the protection mode when receiving the protection signal or when receiving the protection signal lasting for a second preset time period, wherein the second preset time period is shorter than the first preset time period.

8. An LED driving circuit, comprising:
    at least one light-emitting unit, each the light-emitting unit comprising:
        an LED string coupled to a driving voltage;
        a current regulator coupled to a corresponding LED string to control a current flowing through the corresponding LED string; and
        a transistor having a first terminal coupled to the LED string and a second terminal coupled to the current regulator; and a protection detecting circuit coupled to the at least one first terminal and generating a clamping reference level signal to a control terminal of each transistor of the at least one light-emitting unit, wherein the protection detecting circuit decreases a level of the clamping reference level signal to reduce or cut off the current of the at least one LED string when any voltage of the at least one first terminal is higher than a preset protection value.

9. The LED driving circuit according to claim 8, further comprising at least one diode having a positive terminal coupled to the corresponding first terminal, and a negative terminal coupled to the protection detecting circuit.

10. The LED driving circuit according to claim 8, wherein the protection detecting circuit further receives a dimming signal, and performed a determination operation to determine whether the voltage of the at least one first terminal is higher than a preset protection value when the dimming signal represents a first state, and stops the determination operation when the dimming signal represents a second state.

11. The LED driving circuit according to claim 10, further comprising a least one diode having a positive terminal coupled to the corresponding first terminal, and a negative terminal coupled to the protection detecting circuit.

12. An LED driving circuit, comprising:
a plurality of LED strings coupled to a driving voltage;
a current regulator coupled to each of the LED strings to control a current flowing through the LED string;
a plurality of transistors coupled between a corresponding LED string and a corresponding current regulator; and
a plurality of protection detecting circuits respectively coupled to a connection node of the corresponding LED string and the corresponding transistor and receiving a dimming signal;
wherein each of the protection detecting circuits generates a protection signal to enable the corresponding transistor or the corresponding current regulator to reduce or cut off the current of the corresponding LED string when the dimming signal represents a first state and a voltage of the corresponding connection node is higher than a preset protection value, and each of the protection detecting circuits stops generating the protection signal when the dimming signal represents a second state.

13. The LED driving circuit according to claim 12, wherein the protection detecting circuits respectively reduce or cut off the currents of their corresponding LED strings when any one of the protection detecting circuits generates the protection signal.

14. An LED driving circuit, comprising:
at least one light-emitting unit, each of the light-emitting unit comprising:
an LED string coupled to a driving voltage;
a current regulator coupled to a corresponding LED string for controlling a current flowing through the corresponding LED string; and
a transistor having a first terminal coupled to the corresponding LED string and a second terminal coupled to the current regulator; and
a protection detecting circuit coupled to the at least one first terminal and receiving a dimming signal, wherein the protection detecting circuit generates a protection signal when the dimming signal represents a first state and any first terminal has a voltage higher than a preset protection value, and the protection detecting circuit stops generating the protection signal when the dimming signal represents a second state;
wherein all current regulators or the current regulators corresponding to the first terminal having a voltage higher than the protection value reduce or cut off the current flowing therethrough when the protection signal is generated.

15. The LED driving circuit according to claim 14, further comprising at least one diode, wherein each of the at least one diode has a positive terminal coupled to a corresponding first terminal, and a negative terminal coupled to the protection detecting circuit.

16. The LED driving circuit according to claim 15, wherein each transistor has a control terminal receiving a clamping reference level signal for clamping the voltage of the first terminal, and the current regulator stabilizes the current flowing through the corresponding LED string at a first current value, and stabilizes the current flowing through the corresponding LED string at a second current value when receiving the protection signal.

17. The LED driving circuit according to claim 15, further comprising a safe operation detecting circuit and a safe operation protecting circuit, wherein the safe operation detecting circuit is coupled to the at least one current regulator, and generates an error signal when a voltage or a current of any current regulator exceeds a preset safety limit value, and the safe operation protecting circuit enters a protection mode to enable the at least one current regulator to reduce or cut off the current of the LED string when receiving the error signal lasting for a first preset time period.

18. The LED driving circuit according to claim 15, further comprising a safe operation detecting circuit and a safe operation protecting circuit, wherein the safe operation detecting circuit is coupled to the at least one current regulator, and generates an error signal when a voltage or a current of any current regulator exceeds a preset safety limit value, and the safe operation protecting circuit enters a protection mode to enable the at least one current regulator to reduce or cut off the current of the LED string when receiving the error signal lasting for a first preset time period.

19. The LED driving circuit according to claim 18, wherein the safe operation protecting circuit enters the protection mode when receiving the protection signal or when the receiving protection signal lasting for a second preset time period, wherein the second preset time period is shorter than the first preset time period.

20. The LED driving circuit according to claim 14, wherein each transistor has a control terminal receiving a clamping reference level signal for clamping the voltage of the first terminal, and the current regulator stabilizes the current flowing through the corresponding LED string at a first current value, and stabilizes the current flowing through the corresponding LED string at a second current value when receiving the protection signal.

* * * * *